(12) United States Patent
Murray et al.

(10) Patent No.: US 7,429,212 B1
(45) Date of Patent: Sep. 30, 2008

(54) INCISION CLOSING CLIP

(76) Inventors: Pauline B. Murray, 15516 Orchard Run Dr., Bowie, MD (US) 20715; Maurice W. Murray, 11516 Orchard Run Dr., Bowie, MD (US) 20715

( * ) Notice: Subject to any disclaimer, the term of this patent is extended or adjusted under 35 U.S.C. 154(b) by 0 days.

(21) Appl. No.: 11/627,769

(22) Filed: Jan. 26, 2007

(51) Int. Cl.
*A22C 21/00* (2006.01)
(52) U.S. Cl. ...................................................... 452/176
(58) Field of Classification Search ............... 24/489, 24/499–502, 507–511, 521, 556, 561, 562, 24/350, 355; 452/174–176
See application file for complete search history.

(56) References Cited

U.S. PATENT DOCUMENTS

| | | | | |
|---|---|---|---|---|
| 1,992,023 | A * | 2/1935 | Cahn | 132/135 |
| 2,256,887 | A | 9/1941 | Beck | |
| 2,325,212 | A * | 7/1943 | Adams | 24/507 |
| 2,516,359 | A | 7/1950 | Zoller | |
| 2,596,635 | A * | 5/1952 | Wolfe | 24/503 |
| 2,669,747 | A | 2/1954 | Detaranto | |
| 2,704,389 | A | 3/1955 | Lilly | |
| 2,926,407 | A | 3/1960 | Cassell | |
| 3,114,950 | A * | 12/1963 | Seliman | 24/712.2 |
| 3,125,779 | A | 3/1964 | Abess | |
| 3,201,824 | A | 8/1965 | Konopa | |
| D423,305 | S | 4/2000 | Foster et al. | |
| 6,484,374 | B2 * | 11/2002 | McAllister | 24/557 |
| 6,969,547 | B2 * | 11/2005 | Damast | 428/99 |
| 7,066,185 | B2 * | 6/2006 | Hildebrandt | 132/210 |

\* cited by examiner

*Primary Examiner*—Thomas Price
(74) *Attorney, Agent, or Firm*—Advantia Law Group; Michael W. Starkweather; Jason P. Webb

(57) ABSTRACT

An incision closing clip for closing an incision. The invention includes: a pair of curved clamp members, each including: an semi-tubular body member; an elongated plate member, each an edge of the semi-tubular body members; a plurality of protrusions, disposed along the elongated plate members and extending outwardly and orthogonal therefrom; and a pair of handle members, each coupled to an edge of the semi-tubular body members. Additionally, there is a joint member rotatably coupled to the clamp members. The joint member comprises a torsion spring. In addition, a cross-section of the first plurality of protrusions and a cross-section of the second plurality of protrusions is substantially triangular.

6 Claims, 2 Drawing Sheets

INCISION CLOSING CLIP

BACKGROUND OF THE INVENTION

1. Field of the Invention

The present invention relates to incision closing clips, specifically an incision closing clip for closing an incision.

2. Description of the Related Art

Individuals typically employ incision clips to hold the edges of incisions in fowls such as turkeys, chicken roast, fish, etc. closed. This is needed to prevent fluids, stuffing, etc. from falling out and to prevent the flesh at the edges of the incision from separating during roasting. Heretofore, incision clips and other fasteners such as stitches, pins, skewers, etc. have been used for this purpose, but it takes considerable time and labor to apply those devices and they are easily misplaced. Some improvements have been made in the field. Examples include but are not limited to the references described below, which references are incorporated by reference herein:

U.S. Pat. No. 2,704,389, issued to Lilly, discloses a skewer clip.

U.S. Pat. No. 2,669,747, issued to Detaranto, discloses a device for closing incisions in fowls or the like.

U.S. Pat. No. 2,256,887, issued to Beck, discloses a flesh clamping device.

U.S. Pat. No. 3,125,779, issued to Abess, discloses a stuffing retainer.

U.S. Pat. No. 2,926,407, issued to Cassell, discloses an incision closing clip.

U.S. Pat. No. 3,201,824, issued to Konopa, discloses a holder for birds.

U.S. Design Pat. No. D423,305, issued to Foster et al., discloses an ornamental design for a barbeque ribs clamp.

The inventions heretofore known suffer from a number of disadvantages which include: being inconvenient to use; being easily misplaced; being difficult and uncomfortable to grip; being unable to withstand very high oven temperatures; and/or being not strong enough to hold incisions closed during prolonged roasting of fowls.

What is needed is an incision closing clip that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available incision closing clips. Accordingly, the present invention has been developed to provide an incision closing clip for closing an incision.

There is one embodiment of an incision closing clip for closing an incision. The present invention may include: a first curved clamp member that may include: a first semi-tubular body member; a first elongated plate member that may be disposed along a first edge of the first semi-tubular body member; a first plurality of protrusions that may be disposed along the first elongated plate member and/or extending outwardly therefrom substantially orthogonal to the first elongated plate member; and a first handle member that may be coupled to a second edge of the first semi-tubular body member opposite the first elongated plate member.

Another embodiment of the present invention may also include: a joint member that may be rotatably coupled to the first clamp member; and a second curved clamp member that may be rotatably coupled to the joint member opposite the first clamp member. The second curved clamp member may also comprise: a second semi-tubular body member; a second elongated plate member that may be disposed along a third edge of the first semi-tubular body member; a second plurality of protrusions that may be disposed along a the second elongated plate member and/or extending outwardly therefrom substantially orthogonal to the first elongated plate member; and a second handle member that may be coupled to a fourth edge of the second semi-tubular body member opposite the second elongated plate member.

In yet another embodiment of the present invention, the joint member may be in the form of a torsion spring.

In still yet another embodiment of the present invention, there may be a cross-section of the first plurality of protrusions and a cross-section of the second plurality of protrusions that may be substantially triangular in shape.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
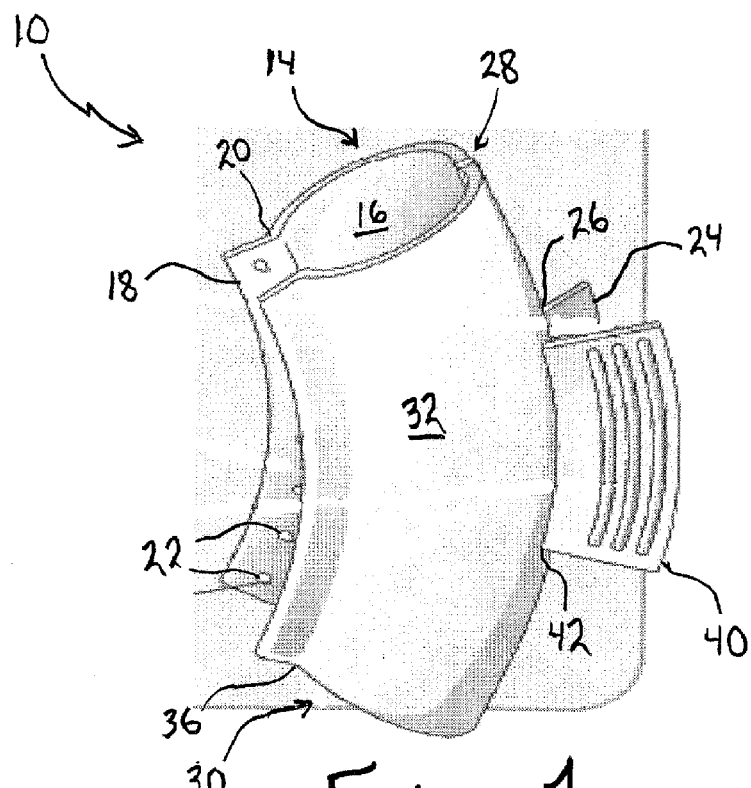
FIG. 1 illustrates a perspective view of an incision clip, according to one embodiment of the invention.
Figure 2:
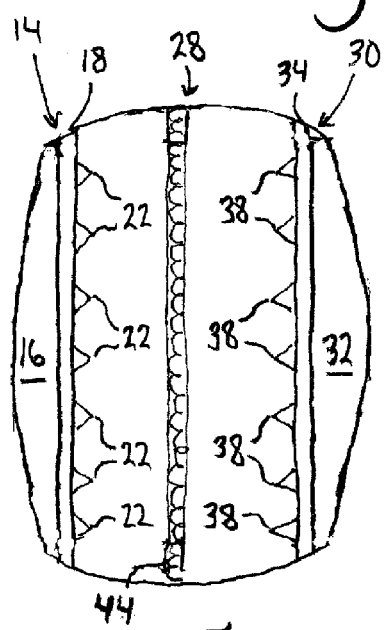
FIG. 2 illustrates a side elevational view of an incision clip, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Looking to the figures, there is an illustrated embodiment of an incision closing clip 10 for closing an incision 12 disposed on a fowl 13 such as a turkey. The present invention includes: a first curved clamp member 14 having: a first semi-tubular body member 16; a first elongated plate member 18 disposed along a first edge 20 of the first semi-tubular body member 16; a first plurality of protrusions 22 disposed along the first elongated plate member 18 and extending outwardly therefrom substantially orthogonal to the first elongated plate member 14; and a first handle member 24 coupled to a second edge 26 of the first semi-tubular body member 16 opposite the first elongated plate member 14.

Figure 3:
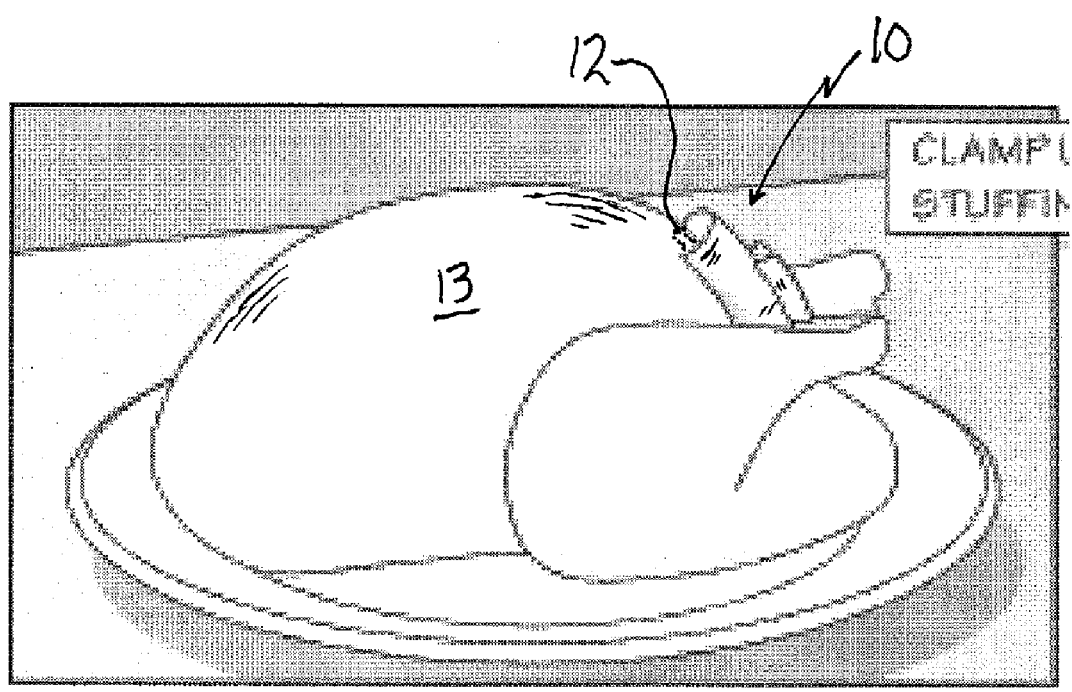
FIG. 3 illustrates a perspective view of an incision clip, according to one embodiment of the invention.

Another embodiment of the present invention may also include: a joint member 28 rotatably coupled to the first clamp member 14; and a second curved clamp member 30 rotatably coupled to the joint member 28 opposite the first clamp member 14. On skilled in the art would appreciate the clamp members 14, 30 are curved to substantially conform to the curvature of the fowl 13 (also referred to as a turkey), as shown in FIG. 3, so as the clip can adequately close the entire incision 12. Similar to the first clamp member 14, the second clamp member 30 further comprises: a second semi-tubular body member 32; a second elongated plate member 34 disposed along a third edge 36 of the second semi-tubular body member 30; a second plurality of protrusions 38 disposed along the second elongated plate member 34 and extending outwardly therefrom substantially orthogonal to the second elongated plate member 30; and a second handle member 40 coupled to a fourth edge 42 of the second semi-tubular body member 32 opposite the first elongated plate member 18.

In yet another embodiment of the present invention, the joint member 28, as shown, is a torsion spring 44 that serves as a mechanism to apply a sufficient inward force to close the clamping members 14, 30 and plate members 18, 36. In turn, this enables the substantially triangular shaped protrusions 22, 38 to penetrate the body of the turkey 13 upon contact, so as to close the incision 12 thereon, thereby preventing the leakage of stuffing or the like.

In operation of the illustrated embodiment, the user may grab and apply an inward force against the handle members 24, 40 such that they will move inwardly toward each other while causing the clamp members 14, 30 to separate from each other when preparing to cook the turkey 13. The user may then insert stuffing or the like into the incision 12 and place the plate members 18, 36 against the body of the turkey 13 near the incision 12. The user may then release the force applied against the handle members allowing the torsion spring 44 to apply an inward force, causing the clamping members and plate members to close. This enabling the protrusions 22, 38, such as sharp spikes to penetrate the body of the turkey and close the incision 12 shut.

Embodiments of the incision clip 10 provide a time-saving alternative to stitching the openings of an incision 12 shut. The present invention also helps to prevent spillage of meat fluids, stuffing, etc., and is compact for convenient storage in a drawer or other storage areas/spaces.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although FIG. 3 illustrates the incision closing clip 10 closing an incision 12 disposed the fowl 13 being a turkey, one skilled in the art would appreciate that the clip may be employed to close an incision 12 disposed on other fowl. For example, chicken, fish, etc.

It is also envisioned that one skilled would appreciate that the clamp members 14, 30; body members 16, 32; protrusions 22, 38; and/or handle members 24, 40 may be shaped differently, according to various embodiments. For example, triangular, square, rectangular, etc.

It is expected that there could be numerous variations of the design of this invention. An example is that the clamp members 14, 30; body members 16, 32; plate members 18, 36; protrusions 22, 38; handle members 24, 40; and/or joint member 28 may vary in length, width, size, color, design, thickness, shape, etc., according to various embodiments.

Finally, it is envisioned that the components of the device may be constructed of a variety of non-limiting examples of heat-resistant or insulating materials, such as polysulfone, polyetherimide, polyamideimide, and polyphenylene, etc. such that the incision clip 10 can withstand substantially high oven temperatures during roasting of fowl 13.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An incision closing clip for closing an incision, comprising:
   a) a first curved clamp member, including:
      a1) a first semi-tubular body member;
      a2) a first elongated plate member, disposed along a first edge of the first semi-tubular body member;
      a3) a first plurality of protrusions, disposed along the first elongated plate member and extending outwardly therefrom substantially orthogonal to the first elongated plate member; and
      a4) a first handle member, coupled to a second edge of the first semi-tubular body member opposite the first elongated plate member;
   b) a joint member, rotatably coupled to the first clamp member; and
   c) a second curved clamp member, rotatably coupled to the joint member opposite the first clamp member, including:
      c1) a second semi-tubular body member;
      c2) a second elongated plate member, disposed along a third edge of the second semi-tubular body member;
      c3) a second plurality of protrusions, disposed along a the second elongated plate member and extending outwardly therefrom substantially orthogonal to the second elongated plate member; and
      c4) a second handle member, coupled to a fourth edge of the second semi-tubular body member opposite the second elongated plate member.

2. The incision closing clip of claim 1, wherein the joint member comprises a torsion spring.

3. The incision closing clip of claim 2, wherein the first plurality of protrusions and the second plurality of protrusions are substantially triangular.

4. An incision closing clip for closing an incision, consisting essentially of:
   a) a first curved clamp member, including:
      a1) a first semi-tubular body member;
      a2) a first elongated plate member, disposed along a first edge of the first semi-tubular body member;
      a3) a first plurality of protrusions, disposed along the first elongated plate member and extending outwardly therefrom substantially orthogonal to the first elongated plate member; and
      a4) a first handle member, coupled to a second edge of the first semi-tubular body member opposite the first elongated plate member;
   b) a joint member, rotatably coupled to the first clamp member; and
   c) a second curved clamp member, rotatably coupled to the joint member opposite the first clamp member, including:
      c1) a second semi-tubular body member;
      c2) a second elongated plate member, disposed along a third edge of the second semi-tubular body member;
      c3) a second plurality of protrusions, disposed along a the second elongated plate member and extending outwardly therefrom substantially orthogonal to the second elongated plate member; and
      c4) a second handle member, coupled to a fourth edge of the second semi-tubular body member opposite the second elongated plate member.

5. The incision closing clip of claim 4, wherein the joint member comprises a torsion spring.

6. The incision closing clip of claim 5, wherein the first plurality of protrusions and the second plurality of protrusions are substantially triangular.

* * * * *